United States Patent Office 3,433,646
Patented Mar. 18, 1969

3,433,646
CULINARY BATTERS
Graydon N. Savre and Lloyd C. Wernecke, Minneapolis, Minn., assignors to General Mills, Inc., a corporation of Delaware
No Drawing. Filed Nov. 25, 1964, Ser. No. 414,012
U.S. Cl. 99—92    16 Claims
Int. Cl. A21d 13/08

ABSTRACT OF THE DISCLOSURE

Preparation of a culinary batter which can be stored for an extended period of time without liberating $CO_2$ wherein a premix is formed by combining chemical leavening ingredients, natural acid containing ingredients, if any, and water, and permitting the ingredients to react with each other in the presence of the water until a portion of the available $CO_2$ is liberated. The pre-mix when combined with the other batter ingredients forms a batter which can be stored without additional $CO_2$ being released.

---

This invention pertains to a method for making an improved refrigerated baking composition, and more particularly to a method for making a culinary batter or dough mix containing chemical leavening ingredients, which can be stored at refrigerator temperatures in a flexible film package without damage to the package, caused by internal gas pressures, and without deteriorating in the ability to provide a satisfactory baked product. It also relates to the batters or doughs produced by such a method.

Attempts have been made to formulate baking batters or doughs for sale commercially. These batters have presented storage and shipping problems since they should be stored under refrigerated conditions substantially at all times prior to use by the consumer. Such batters or doughs are often packaged in flexible film packages, and stored under refrigerated conditions for an indefinite period of time until they are used by the consumer. It has been found that it is difficult to store batters which contain chemical leavening ingredients, in flexible film packages for any extended period of time, because most commonly used chemical leavening ingredients react with each other in the presence of moisture in the batter until at least a portion of the available carbon dioxide gas is liberated; as a result, the gas pressure within the package increases and the film package might rupture. Most commonly used chemical leavening ingredients include a gas producing agent, such as sodium bicarbonate (baking soda), and a water soluble acidic material which reacts with the gas producing agent to release carbon dioxide. Moreover, most commonly used acidic materials will react with the soda to a greater or lesser extent in the presence of moisture without the application of heat. As used in the art, the term chemical leavening ingredients might include only a gas producing agent. Some batters, in addition to using chemical leavening ingredients, might also include other ingredients which will likewise react with the soda in the presence of moisture and cause $CO_2$ to be liberated; this likewise might result in rupturing the film package.

Accordingly, one object of the present invention is to provide a method for making an improved batter or dough which contains chemical leavening ingredients.

Another object is to provide a method for making a culinary batter or dough containing chemical leavening ingredients, which can be stored at refrigerator temperatures without liberating carbon dioxide gas while stored.

A further object is to provide a process for making a culinary batter or dough containing a gas producing chemical leavening agent and a water soluble acidic material, which can be packaged in a flexible film package without liberating $CO_2$ while stored at refrigerator temperatures, for an indefinite period of time.

Still another object is to provide a method for making a culinary batter or dough which contains natural acid containing ingredients and chemical leavening ingredients, and which can be stored for moderately long periods of time in a flexible film container without generating $CO_2$ and causing the film container to rupture.

A still further object is to provide an improved baking composition containing chemical leavening ingredients, which can be stored for an indefinite period of time without liberating $CO_2$, and which will have an extended storage life.

Another object is to provide a culinary batter or dough containing chemical leavening ingredients which can be stored for an extended period of time at refrigerator temperatures without releasing $CO_2$.

A still further object is to provide a culinary batter or dough containing chemical leavening ingredients and natural acid containing ingredients, which can be packaged in a flexible film container and stored at refrigerator temperatures without liberating $CO_2$.

Other objects and advantages of this invention will become apparent from a consideration of the following detailed description of the invention.

In general, the invention involves preparing a culinary batter or dough by forming a pre-mix by combining the chemical leavening ingredients used, as well as any other ingredients which might be used in the batter which are acidic enough to react with the leavening ingredients in the presence of water, in a portion of the bater water, and permitting them to react with each other so that a portion of the available carbon dioxide gas is liberated, and said other ingredients are substantially neutralized. The remaining batter ingredients are thereafter combined and mixed with the pre-mix, and the batter is subsequently packaged in a film package. By reacting the leavening ingredients with each other in this manner before the remaining ingredients are added, a portion of the available $CO_2$ is released, and additional liberation of $CO_2$ during storage of the batter is curbed. The residual leavening components will not react and liberate additional $CO_2$ until a higher temperature is provided. By reacting the leavening ingredients in this manner, the batter can be packaged in a flexible film package and stored for an extended period of time without liberating carbon dioxide during storage, thereby creating an excessive internal gas pressure within the package which might cause the film package to rupture.

Although a number of specific examples are provided hereinafter which illustrate some of the types of culinary batters in which the invention can be practiced, the method for making the batters is substantially the same for all of the examples. The method involves combining all the batter ingredients which will react with each other in the presence of moisture to produce carbon dioxide gas, before adding additional batter ingredients. These first ingredients include any chemical leavening ingredients used, such as a gas producing agent and/or an acidic material for reaction with the gas producing agent, as well as any natural acid containing ingredients which might be used, such as dates, raisins, oranges, apples, bananas, and the like.

The above ingredients are combined with about one half of the amount of water used in the batter to form an aqueous solution, or pre-mix. The pre-mix is mixed or stirred until the ingredients react and liberate a portion of the available carbon dioxide gas. The time required to react these ingredients varies, depending upon the type of acidic material used, the type of natural acid-containing ingredient used, the temperature of the water, and the like. The other ingredients forming the batter, which might include flour, sugar, eggs, shortening, additional water, and minor ingredients such as salt, flavoring agents, emulsifiers, and the like, are then combined and mixed with the pre-mix. All the ingredients are then mixed and blended together to form a homogeneous batter. The residual leavening components will not react to liberate additional $CO_2$ until a higher temperature is provided. The resulting batter can be kept for an extended period of time without rupturing the package material, and results in an excellent baked product.

The flour used can be any of those customarily used in batters. Suitable sugars for use comprise any of the commonly used granular sugars including sucrose, dextrose, maltose, fructose, lactose, brown or powdered sugar. A plastic shortening, rather than a liquid shortening or a vegetable oil is preferred, although it is envisioned that the latter types might also be used. In this connection, an emulsified shortening might also be used, or if desired, an emulsifier might be included in addition to the shortening ingredient.

Preferably, the type and amount of carbon dioxide gas producing agent used, will be sodium bicarbonate. It is envisioned, however, that other types of gas producing agents might also be used, such as potassium bicarbonate. The amount of soda used will vary, depending upon the amount and kind of baking acid used, the desired pH of the product, and the like.

The acidic material or baking acid used can also vary; numerous baking acids are available which might be used. Essential characteristics of the acid are that a portion of it will initially react with the soda within a first temperature range to release carbon dioxide; that it will not continue to react with the soda after the initial reaction takes place and the remaining batter ingredients have been added; and that it will retain a portion of its leavening ability so as to react with the soda at a higher temperature to liberate additional $CO_2$ at a higher temperature. As stated above, most commonly used baking acids react with soda to a greater or lesser extent in the presence of moisture without the application of heat. The amount of time required to release carbon dioxide will vary however, as some acids react more quickly with soda than others. Monocalcium phosphate for example, will react with soda in the presence of water at a prescribed temperature more quickly than anhydrous monocalcium phosphate. Both acids however, can be used with satisfactory results. Other baking acids which are commercially available will likewise react differently at different temperatures; some for example, require more time. Some other commonly used baking acids which might be used are: dicalcium phosphate, sodium aluminum phosphate, sodium aluminum sulfate, sodium acid pyrophosphate, and the like. Moreover, in some instances it might be desirable to combine one or more of the acids.

Different kinds of natural acid containing ingredients might be used; some examples are fruits such as dates, bananas, raisins, oranges and/or orange peels, lemons and/or lemon peels, apples, cherries, cranberries, and the like, or combinations of these. In most instances, it is envisioned that such a natural acid containing ingredient will be included in addition to baking soda and a baking acid.

In this regard, while it is contemplated that a gas producing agent, such as baking soda, is always used in the batter, the inclusion of both a baking acid and a natural acid containing ingredient can be optional. For example, in some instances both a baking acid and an acid containing fruit ingredient might be used with the soda; in some instances only a fruit ingredient might be used with the soda; and in some instances only a baking acid might be used with the soda.

The culinary batter of this invention might also include egg whites, egg yolks, salt, flavoring agents, artificial colorants, non-fat milk solids, guar gum, and the like.

Numerous culinary batters can be made according to the present invention from the above-noted ingredients. The amounts of the various ingredients will vary depending upon the type of batter to be prepared. The ingredients are generally used in the following ranges for the following batters.

DATE-NUT LOAF BATTER

| Ingredients: | Parts by weight |
|---|---|
| Flour | 100 |
| Water | 88–104 |
| Sugar | 70–85 |
| Dates—chopped | 15–60 |
| Nuts—chopped | 4–25 |
| Shortening | 3–10 |
| Emulsifier | 0–2 |
| Egg yolk solids | 2–6 |
| Egg white solids | 1–5 |
| Sodium bicarbonate | 2–4 |
| Monocalcium phosphate | 0–2.3 |
| Salt | 1.8–4 |
| Guar gum | 0–1.1 |

NUT LOAF BATTER

| Ingredients: | Parts by weight |
|---|---|
| Flour | 100 |
| Water | 73–88 |
| Sugar | 72–88 |
| Nuts—chopped | 5–40 |
| Shortening | 5–11 |
| Emulsifier | 0–3 |
| Egg yolk solids | 2–8 |
| Egg white solids | 1–4 |
| Sodium bicarbonate | 2–5 |
| Monocalcium phosphate | 2–5 |
| Salt | 2–4 |
| Syrup | 0–6 |
| Guar gum | 0–1 |
| Flavoring agent | 0–3 |
| Colorant | 0–.05 |

BANANA LOAF BATTER

| Ingredients: | Parts by weight |
|---|---|
| Flour | 100 |
| Water | 20–32 |
| Sugar | 76–90 |
| Banana—mashed | 62–77 |
| Shortening | 3–12 |
| Emulsifier | 0–3 |
| Egg yolk solids | 2–6 |
| Egg white solids | 1–4 |
| Sodium bicarbonate | 2–4.5 |
| Monocalcium phosphate | 0–2.4 |
| Salt | 2–4 |
| Guar gum | 0–.5 |
| Flavoring agents | 0–.07 |

ORANGE LOAF BATTER

| Ingredients: | Parts by weight |
| --- | --- |
| Flour | 100 |
| Water | 73–88 |
| Sugar | 72–88 |
| Orange peel—chopped | 5–40 |
| Shortening | 5–12 |
| Emulsifier | 0–5 |
| Egg yolk solids | 2–9 |
| Egg white solids | 2–4 |
| Soda | 2–5 |
| Monocalcium phosphate | 1–5 |
| Salt | 2–4 |
| Guar gum | 0–1 |
| Flavoring agents | 0–4.5 |
| Colorant | 0–1 |

COFFEE CAKE BATTER

| Ingredients: | Parts by weight |
| --- | --- |
| Flour | 100 |
| Water | 74–89 |
| Sugar | 76–90 |
| Shortening | 20–40 |
| Emulsifier | 1–5 |
| Egg yolk solids | 2–8 |
| Egg white solids | 1–4 |
| Sodium bicarbonate | 2.5–5 |
| Monocalcium phosphate | 0–6 |
| Salt | 1.2–4 |
| Flavoring agents | 0–.4 |
| Non-fat milk solids | 3–8.5 |

A preferred range for the ingredients of a date-nut loaf batter is as follows:

| Ingredients: | Parts by weight |
| --- | --- |
| Flour | 100 |
| Water | 95–98 |
| Sugar | 77–80 |
| Dates—chopped | 36–40 |
| Nuts—chopped | 10–12 |
| Shortening | 3.5–6 |
| Emulsifier | 1.5–2 |
| Egg yolk solids | 4–5 |
| Egg white solids | 2–3 |
| Sodium bicarbonate | 3–4 |
| Monocalcium phosphate | 1–2 |
| Salt | 1.5–2.5 |
| Guar gum | 0.3–0.5 |

As indicated hereinbefore, the ingredients are combined in a prescribed manner. Batters are prepared by combining in a mixing bowl the chemical leavening ingredients (e.g., soda and monocalcium phosphate) and the natural acid containing ingredients (e.g., dates), in a portion of the water to form a pre-mix, and permitting them to react until a portion of the available carbon dioxide is liberated. In this regard, either dried dates or natural dates might be used; both types are commercially available. The dates become substantially neutralized during this period. Preferably, about one half of the water is used, and its temperature should be in the range of 45° to 100° F., and preferably in the range of 50° to 60° F. The time required to react the ingredients will vary depending upon the specific ingredients used. The remaining non-liquid ingredients are added to the mixing bowl and the resulting mixture is blended and mixed for 1–2 minutes. The remaining portion of the water is then added and the batter is mixed long enough to form a uniform, homogeneous batter, normally for an additional 1–2 minutes. The batter is then packaged in flexible film packages to form individual packages of desired size. The packages are then stored under refrigerator conditions ranging from a temperature of 35° to 60° F., and preferably at about 40° F., for an indefinite period of time. The residual leavening components again react with each other when a higher temperature is provided, for example when it reaches 140–150° F.

In this connection, it might be added that although it is preferable to store the batters under refrigerated conditions, it has been found that the batters will remain substantially stable, i.e., no leavening reaction takes place within the package, even though the batters were stored at room temperatures; it should be noted however that the batter might not keep as long, that is, mold, and other microbiological growths might appear which might adversely effect the product.

Although the above procedure describes one way of making the batter, the various steps might be changed slightly, or combined. For example, all the ingredients, including the remaining portion of the water, might be added to the pre-mix and subsequently mixed at the same time. Another alternative would be to combine and mix all the ingredients except the leavening ingredients, the natural acid containing ingredients, and a portion of the water, in a mixing bowl, the gas forming ingredients could then be reacted as described above in a separate container to form a pre-mix, and this pre-mix then added to the ingredients in the mixing bowl.

To illustrate the application of the present invention to various culinary batters, the following detailed examples are set forth:

Example I

A date-nut loaf batter was prepared from the following ingredients:

| Ingredients: | Parts by weight |
| --- | --- |
| Flour | 100 |
| Water | 96.5 |
| Sugar—sucrose | 78.5 |
| Dates—dried | 38.7 |
| Nuts—chopped almonds | 11.1 |
| Shortening | 4.3 |
| Emulsifier | 1.7 |
| Egg yolk solids | 4.4 |
| Egg white solids | 2.2 |
| Sodium bicarbonate | 3.6 |
| Monocalcium phosphate | 1.5 |
| Salt | 2.1 |
| Guar gum | 0.4 |

The batter was prepared by forming a pre-mix by combining and mixing the dates, the soda, and the monocalcium phosphate in a mixing bowl with about one-half of the water, said water having a temperature of about 60° F., for about 5 minutes. Dried dates were used having a moisture content of about 5%. These ingredients reacted with each other to liberate a portion of the available carbon dioxide gas during this period, this reaction could be readily observed. During this period of time, the dates become neutralized and after this period, no further reaction could be observed. The flour, sugar, nuts, shortening, emulsifier, eggs, salt, and the guar gum were combined with the pre-mix by adding them to the mixing bowl, and these ingredients were mixed together for about 2 minutes to form a mixture. The remaining portion of the water was then added and the ingredients again mixed for about 2 minutes to form a uniform, homogeneous batter. The batter was packaged in individual flexible film packages, and stored at a temperature of about 40° F.

Periodic storage tests were made. After 12 weeks, the batter was tested and its quality was still good, that is, there was no serious discoloration, there were no offensive odors, there were no mold growths, and there was no internal gas pressure of sufficient magnitude to cause any damage to the film package. After baking, the loaf resulted in a product of excellent quality.

The amounts of chemical leavening ingredients and dates indicated above resulted in a product having a pH slightly on the alkaline side. If desired of course, the amounts of these ingredients could be varied so as to give a pH factor which was neutral, or on the acid side.

Example II

An orange loaf batter was prepared from the following ingredients:

| Ingredients: | Parts by weight |
| --- | --- |
| Flour | 100 |
| Water | 80.9 |
| Sugar—sucrose | 79.5 |
| Orange peel [1] | 20.7 |
| Shortening | 9.9 |
| Emulsifier | 1.1 |
| Egg yolk solids | 5.5 |
| Egg white solids | 2.1 |
| Sodium bicarbonate | 3.5 |
| Monocalcium phosphate | 3.8 |
| Salt | 2.4 |
| Guar gum | 0.2 |
| Flavoring | 0.2 |
| Colorant | 0.03 |

[1] A moist, diced orange peel available under the trade name Pennat Orange Peel was used.

The batter was prepared in substantially the same manner described above in Example I; that is, the soda, monocalcium phosphate, and the orange peel were initially reacted together to form a pre-mix, and the remaining ingredients subsequently added and mixed to form the batter. Storage tests performed after 16 weeks indicated that the batter was still in good condition and that no adverse effects were present.

The above examples demonstrate the advantages of the batters of the present invention. The batters were prepared in a simple manner and the resulting loaves had excellent qualities.

As indicated hereinbefore, the ingredients of the batters can be changed so as to produce a wide variety of baked goods. In addition, variations can be made in the steps followed, the mixing times, temperature of the water, and the like.

In the above description, a disclosure of the principles of this invention is presented, together with some specific examples by which the invention may be carried out.

Now therefore we claim:

1. A method for making a culinary batter capable of being stored before baking for an extended period of time which comprises forming a pre-mix containing water and ingredients adapted to react with each other in the presence of moisture to generate carbon dioxide gas, permitting said ingredients to react with each other in the presence of said water until a portion of the available $CO_2$ is liberated, combining said pre-mix with other batter forming ingredients, and mixing and blending all the ingredients together to form said batter.

2. A method for making a culinary batter capable of being stored before baking for an extended period of time at refrigerator temperatures which comprises forming a pre-mix containing leavening ingredients and a portion of the water to be contained in said batter, mixing said pre-mix and permitting the leavening ingredients to react with each other in the presence of said water until a portion of the available $CO_2$ is released, combining the remaining ingredients forming the batter, including the remaining portion of said water needed to form the batter, with said pre-mix, and mixing all the ingredients together to form said batter.

3. A method for making a culinary batter suitable for prolonged storage at refrigerator temperatures which comprises forming an aqueous solution containing chemical leavening ingredients and a portion of the water to be contained in said batter, mixing said solution and permitting said leavening ingredients to react with each other thereby liberating a portion of the available $CO_2$, adding non-liquid batter forming ingredients to the aqueous solution, mixing and blending said non-liquid ingredients with said solution, adding the remainder of the water needed to form the batter, and mixing all the ingredients together to form a substantially homogeneous batter.

4. The method of claim 3 wherein the water which is combined with the leavening ingredients comprises about one-half of the water contained in the batter, the temperature of said water being in a range of about 45° to 100° F.

5. The method of claim 3 wherein the residual leavening ingredients will not react with each other until a temperature of at least 140° F. is provided.

6. The method of claim 3 wherein the non-liquid batter forming ingredients and the aqueous solution are mixed and blended for a period of one to two minutes, and all the ingredients are mixed together for a period of one to two minutes after all the water has been added.

7. The method of claim 3 wherein the leavening ingredients include a non-toxic gas producing leavening agent and a non-toxic water soluble acidic material.

8. The method of claim 3 which includes packaging the batter in flexible film packages.

9. A method for making a culinary batter suitable for prolonged storage at refrigerator temperatures which comprises forming a pre-mix by combining leavening ingredients, a portion of the water to be used in the batter, and all natural acid containing ingredients together, blending said ingredients together and permitting said leavening ingredients and said acid containing ingredients to react with each other thereby liberating a portion of the available $CO_2$, combining said pre-mix with the remaining batter forming ingredients, including the remaining portion of the water needed to form the batter, and mixing and blending all the ingredients together to form said batter.

10. The method of claim 9 wherein the chemical leavening ingredients comprises a gas producing leavening agent which reacts with the natural acid containing ingredients to liberate $CO_2$.

11. The method of claim 9 wherein the leavening ingredients comprises a gas producing leavening agent and a water soluble acidic material, said leavening ingredients together with the natural acid containing ingredients reacting to liberate $CO_2$.

12. A process for making a culinary batter which contains ingredients such as flour, sugar, shortening, eggs, and water, the step which comprises combining and mixing with said ingredients an aqeous solution containing a portion of the water to be used in the batter and chemical leavening ingredients, said leavening ingredients reacting with each other in the presence of said water thereby liberating a portion of the available $CO_2$ prior to combining and mixing it with the non-liquid batter forming ingredients and the remaining portion of the water needed to form the batter.

13. A process for making a culinary batter which contains ingredients such as flour, sugar, shortening, eggs, and water, the step which comprises combining and mixing with said ingredients a pre-mix containing a portion of the water to be contained in the batter, natural acid containing ingredients, and chemical leavening ingredients, said leavening ingredients reacting with said natural acid containing ingredients in the presence of said water thereby liberating a portion of the available $CO_2$ prior to combining and mixing it with the non-liquid batter forming ingredients and the remaining portion of the water needed to form the batter.

14. The method of claim 13 wherein the chemical leavening ingredients include a gas producing leavening agent and a water soluble acidic material, said leavening agent reacting with both the acidic material and the natural acid containing ingredients to liberate a portion of the available $CO_2$.

15. In a method of making a culinary batter by combining and mixing water and other ingredients together to form a batter which can be stored for extended periods of time at temperatures below about 60° F. without liberating carbon dioxide, the improvement which comprises reacting chemical leavening ingredients contained in the batter in a portion of the water to be used in said batter thereby liberating a portion of the available $CO_2$ prior to combining and mixing said leavening ingredients and said water with the other batter forming ingredients, including the remaining portion of said water needed to form the batter.

16. In a method of making a culinary batter by combining and mixing water and other ingredients together to form a batter which can be stored for extended periods of time at temperatures below about 60° F. without liberating carbon dioxide, the improvement which comprises reacting chemical leavening ingredients contained in the batter in a portion of the water and with natural acid containing ingredients to be used in said batter thereby liberating a portion of the available $CO_2$ prior to combining and mixing them with the other batter forming ingredients, including the remaining portion of said water needed to form the batter.

References Cited

UNITED STATES PATENTS

| | | | |
|---|---|---|---|
| 2,810,650 | 10/1957 | Soslin | 99—90 |
| 2,930,698 | 3/1960 | Barch et al. | 99—92 |
| 2,982,662 | 5/1961 | Cochran et al. | 99—92 XR |
| 3,021,220 | 2/1962 | Going et al. | 99—92 |
| 3,170,795 | 2/1965 | Andre | 99—94 |

RAYMOND N. JONES, *Primary Examiner.*